United States Patent
Becker et al.

(10) Patent No.: US 7,117,264 B2
(45) Date of Patent: Oct. 3, 2006

(54) METHOD AND SYSTEM FOR PEER TO PEER COMMUNICATION IN A NETWORK ENVIRONMENT

(75) Inventors: Craig H. Becker, Austin, TX (US); Michael H. Conner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 10/044,997

(22) Filed: Jan. 10, 2002

(65) Prior Publication Data

US 2003/0131129 A1 Jul. 10, 2003

(51) Int. Cl.
*G06F 15/16* (2006.01)

(52) U.S. Cl. ............... 709/227; 709/228; 709/203; 370/468; 370/456

(58) Field of Classification Search .......... 709/201, 709/238
See application file for complete search history.

(56) References Cited

U.S. PATENT DOCUMENTS

| | | | | | |
|---|---|---|---|---|---|
| 4,689,610 | A | * | 8/1987 | Dietrich ............... | 340/515 |
| 4,975,904 | A | * | 12/1990 | Mann et al. .......... | 370/389 |
| 5,167,035 | A | * | 11/1992 | Mann et al. .......... | 714/4 |
| 5,185,860 | A | * | 2/1993 | Wu ..................... | 709/224 |
| 5,241,682 | A | * | 8/1993 | Bryant et al. ......... | 709/249 |
| 5,276,789 | A | * | 1/1994 | Besaw et al. ......... | 345/440 |
| 5,448,561 | A | * | 9/1995 | Kaiser et al. ......... | 370/471 |
| 5,511,208 | A | * | 4/1996 | Boyles et al. ........ | 709/223 |
| 5,521,910 | A | * | 5/1996 | Matthews ............. | 370/256 |
| 5,652,751 | A | * | 7/1997 | Sharony ............... | 370/227 |
| 5,701,427 | A | * | 12/1997 | Lathrop ................ | 709/237 |
| 5,710,885 | A | * | 1/1998 | Bondi .................. | 709/224 |
| 6,065,062 | A | * | 5/2000 | Periasamy et al. ... | 709/242 |
| 6,112,181 | A | * | 8/2000 | Shear et al. .......... | 705/1 |
| 6,128,279 | A | * | 10/2000 | O'Neil et al. ........ | 370/229 |

(Continued)

FOREIGN PATENT DOCUMENTS

JP 2000315200 A * 11/2000

OTHER PUBLICATIONS

XP-002169330, SEC 5.2 Routing Algorithms 1996, pp. 347-367.*

(Continued)

*Primary Examiner*—Khanh Dinh
*Assistant Examiner*—Dhairya A. Patel
(74) *Attorney, Agent, or Firm*—Cardinal Law Group; Jeffrey S. LaBaw

(57) ABSTRACT

A method for communicating among a plurality of peer nodes in a network environment is provided. A discovery command is communicated from a current peer node to at least one neighbor peer node, the neighbor peer node in communication with the current peer node. An aggregated list of peer nodes is received at the current peer node, the aggregated list of peer nodes comprising information about at least one peer node in communication with the at least one neighbor node. Programs and systems of using the method are also provided.

29 Claims, 8 Drawing Sheets

U.S. PATENT DOCUMENTS

| | | | |
|---|---|---|---|
| 2002/0032761 A1* | 3/2002 | Aoyagi et al. | 709/223 |
| 2002/0049760 A1* | 4/2002 | Scott et al. | 707/10 |
| 2002/0069098 A1* | 6/2002 | Schmidt | 705/7 |
| 2002/0073204 A1* | 6/2002 | Dutta et al. | 709/227 |
| 2002/0156920 A1* | 10/2002 | Conrad et al. | 709/242 |
| 2002/0174240 A1* | 11/2002 | Nason et al. | 709/230 |
| 2003/0055892 A1* | 3/2003 | Huitema et al. | 709/204 |
| 2003/0088544 A1* | 5/2003 | Kan et al. | 707/3 |
| 2003/0093562 A1* | 5/2003 | Padala | 709/245 |
| 2003/0095504 A1* | 5/2003 | Ogier | 370/235 |
| 2003/0131129 A1* | 7/2003 | Becker et al. | 709/238 |
| 2003/0131167 A1* | 7/2003 | Rankin et al. | 710/104 |

OTHER PUBLICATIONS

XP-008000376, Michael S. Marmor, "make the p2p leap with toadnode", www.webtechniques.com, Dec. 2000, pp. 44-49.*

XP-002169330, SEC. 5.2 Routing Algorithms, 1996, pp. 347-367.

XP-008000376, Michael S. Marmor, "*make the P2P leap with toadnode*", www.webtechniques.com, Dec. 2000, pp. 44-49.

* cited by examiner

METHOD AND SYSTEM FOR PEER TO PEER COMMUNICATION IN A NETWORK ENVIRONMENT

BACKGROUND OF THE INVENTION

1. Field of the Invention

The present invention relates to methods for communicating between two or more "peer" target devices in a network environment. More specifically, the present invention relates to a method for communicating and distributing information, such as files or search commands, in a network environment by establishing first contact from a first peer target device to a predetermined number of neighbor nodes and receiving aggregated information, such as responses to commands and queries, about the network from the neighbor nodes.

2. Description of the Related Art

During current approaches to distributing information, such as files or search commands, to one or more target devices in a network environment, one or more central servers may be used to communicate the information to a plurality of target devices.

Such a centralized system presents some difficulties. For example, an adverse effect on the central server will affect all target devices communicating with the server.

Other approaches to distributing information use a "peer-to-peer" means of distribution, i.e., a system in which two or more target devices are able to communicate directly with each other. Current protocols of "peer-to-peer" distributed searching and file-sharing present certain difficulties, however.

For example, with the Napster "peer-to-peer" protocol, the files to be shared stay on each target device without passing through a server. However, Napster still uses a server to provide the ability to search for particular files and initiate a direct transfer between the clients. Thus, the Napster protocol may encounter some of the server-related difficulties described above. Additionally, the Napster protocol may encounter such peer-to-peer protocol-related problems as network congestion and search results that are constantly changing as target devices enter and leave the network. The Napster protocol may require large bandwidths, may slow communication and may impede results.

Meanwhile, with the Gnutella protocol, the files to be shared stay on each target device. Additionally, the capability to search for particular files and is also available on each target device. Thus, each target device is able to act as both client and server. However, when a search is conducted from an originating target device using the Gnutella protocol, the search results received at the originating target device may change from second to second as other target devices responding to the originating target device enter and leave the network. Furthermore, when a target device has a response to the originating target device, the results are relayed to the originating target device through the intervening target devices that forwarded the original request. As a search spreads over the Gnutella network, the path from the originating target device to another target device with the desired file may become longer and more convoluted. Thus, the search results may be delayed and may even become outdated before they arrive at the originating target device. The transfer of search results from target devices far away from the originating device may require large bandwidths, may slow communication and may impede results.

It would be desirable, therefore, to provide a method of communicating information among a plurality of target devices that is more efficient, reduces network and processor overhead and improves performance.

SUMMARY OF THE INVENTION

One aspect of the present invention provides a method for communicating among a plurality of peer nodes in a network environment. A discovery command is communicated from a current peer node to at least one neighbor peer node, the neighbor peer node in communication with the current peer node. An aggregated list of peer nodes is received at the current peer node, the aggregated list of peer nodes comprising information about at least one peer node in communication with the at least one neighbor node.

The discovery command may be communicated from the current peer node after a predetermined delay has elapsed. The discovery command may be communicated to a predetermined number of neighbor peer nodes. A peer table may be created at the current peer node and updated with the aggregated list of peer nodes. A second discovery command from an originating peer node may be received at the current peer node and the peer table may be communicated to the originating peer node in response to the second discovery command. A data message having a unique descriptor may be received at the current peer node, the data message having a unique descriptor. The descriptor may be compared to a descriptor table, the descriptor table comprising a plurality of data messages and associated descriptors. The descriptor table may be updated with the received data message and the descriptor of the received data message. A query command may be forwarded from the current peer node to a predetermined number of neighbor peer nodes. Response data may be received directly at the current peer node from at least one other peer node, the at least one other peer node in communication with the at least one neighbor node. A query command from an originating peer node may be received at the current peer node and response data may be communicated directly from the current peer node to the originating peer node, in response to the query command. The query command may be forwarded from the current peer node to a predetermined number of neighbor peer nodes.

Another aspect of the present invention provides computer program product in a computer usable medium for communicating among a plurality of peer nodes in a network environment. The program may include means for communicating a discovery command from a current peer node to at least one neighbor peer node, the neighbor peer node in communication with the current peer node and means for receiving, at the current peer node, an aggregated list of peer nodes, the aggregated list of peer nodes comprising information about at least one peer node in communication with the at least one neighbor node.

Yet another aspect of the present invention provides a system for communicating among a plurality of peer nodes in a network environment. The system may include means for communicating a discovery command from a current peer node to at least one neighbor peer node, the neighbor peer node in communication with the current peer node and means for receiving, at the current peer node, an aggregated list of peer nodes, the aggregated list of peer nodes comprising information about at least one peer node in communication with the at least one neighbor node.

In one embodiment of the invention the program and system of the present invention may further include means for communicating the discovery command from the current peer node after a predetermined delay has elapsed. Means for communicating the discovery command to a predetermined number of neighbor peer nodes may be provided in accordance with the present invention, as well as means for creating a peer table at the current peer node and means for updating the peer table with the aggregated list of peer nodes. In addition, the program and system of the present invention may also comprise means for receiving, at the current peer node, a second discovery command from an originating peer node and means for communicating, from the current peer node directly to the originating peer node, the peer table in response to the second discovery command and for receiving a data message at the current peer node, the data message having a unique descriptor and means for comparing the descriptor of the received data message to a descriptor table, the descriptor table comprising a plurality of data messages and associated descriptors. Means for updating the descriptor table with the received data message and the descriptor of the received data message may be provided in accordance with the present invention. The program and system of the present invention may include means for communicating a query command from the current peer node to a predetermined number of neighbor peer nodes. Additionally the program and system may comprise means for receiving, at the current peer node, response data directly from at least one other peer node, the at least one other peer node in communication with the at least one neighbor node as well as means for receiving, at the current peer node, a query command from an originating peer node and means for communicating, from the current peer node directly to the originating peer node, response data in response to the query command. Means for forwarding the query command from the current peer node to a predetermined number of neighbor peer nodes may also be provided in accordance with the program and system of the present invention.

The foregoing, and other, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims in equivalence thereof.

DETAILED DESCRIPTION OF THE PRESENTLY PREFERRED EMBODIMENTS

Figure 1:
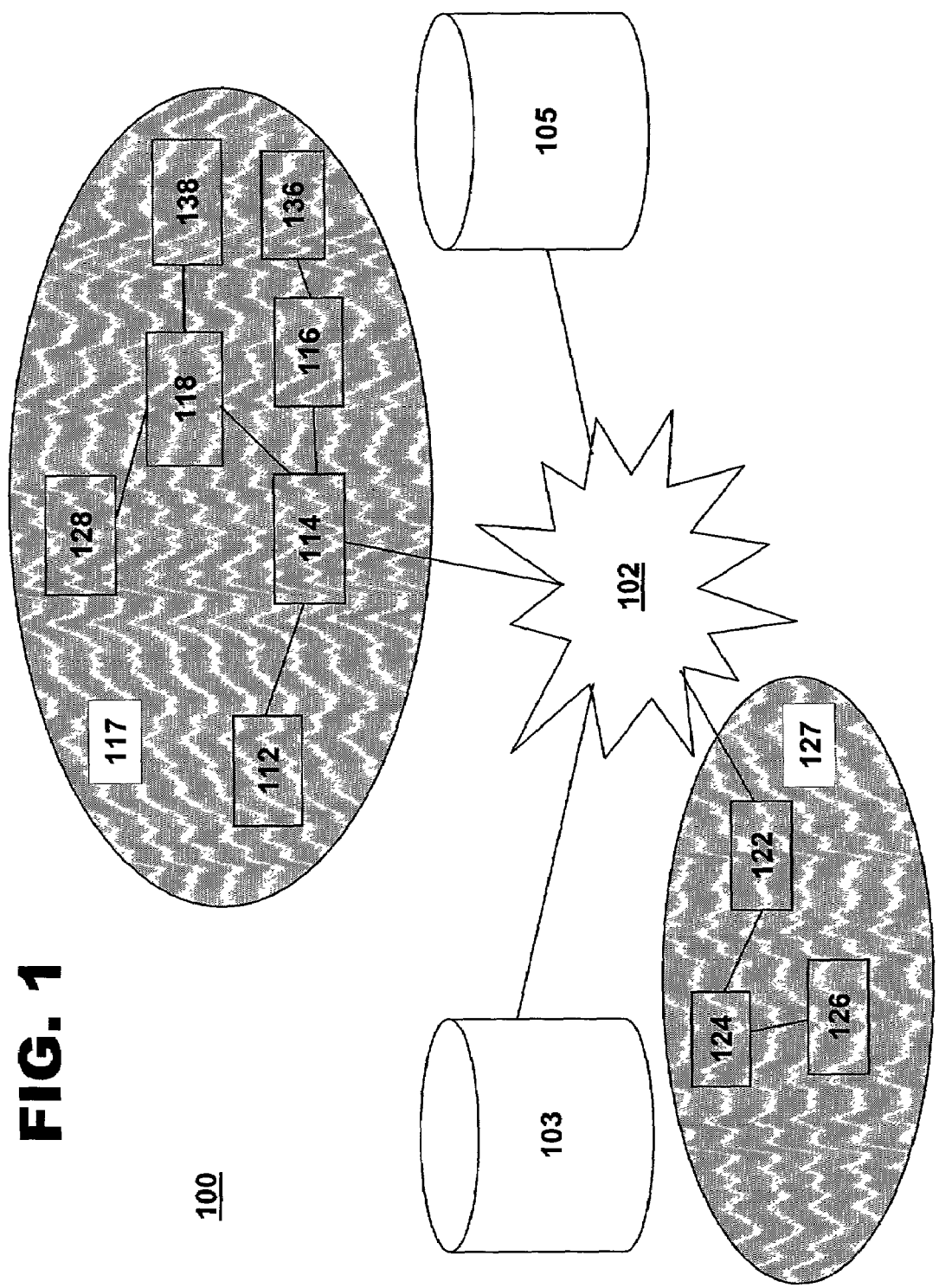
FIG. 1 is a schematic diagram of one embodiment of a network of data processing systems in accordance with the present invention.

FIG. 1 is a schematic representation of a network of data processing systems in accordance with the present invention at 100. Network data processing system 100 may be a network of computers in which the present invention may be implemented. Network data processing system 100 may contain a network. Network 102 may be any suitable medium used to provide communications links between various devices, such as computers, connected to or in communication with each other within network data processing system 100. For example, network 102 may include connections, such as wire connections, wireless communication links or fiber optic cables.

In the embodiment shown in FIG. 1, target devices 112, 114, 116, 118, 122, 124, 126, 128, 136, 138 may be in communication with network 102. These target devices may be, for example, personal computers or network computers. One or more of target devices 112, 114, 116, 118, 122, 124, 126, 128, 136, 138 may serve as peer target devices as described further below. Target devices 112, 114, 116, 118, 122, 124, 126, 128, 136, 138 may also serve as peer nodes to one or more peer target devices as described further below. Network data processing system 100 may include additional servers, clients, target devices, and other devices not shown.

One or more storage units, such as storage unit 103, 105 may also be in communication with network 102. Storage unit 103, 105 may store data, such as boot files, operating system images, application files and applications that may be processed or conveyed by one or more target devices 112, 114, 116, 118, 122, 124, 126, 128, 136, 138. Storage unit 103, 105 may also store data to be made available to or processed by network 102 and/or to other components in communication with network 102 as described below. In some embodiments of the invention, storage units 103, 105 may also serve as peers to target devices 112, 114, 116, 118, 122, 124, 126, 128, 136, 138, providing descriptors, messages and/or response data as detailed further below.

As seen in FIG. 1, network data processing system 100 may be any suitable system of processing data. For example system 100 may be the Internet. Alternatively, network data processing system 100 may also be any suitable type of network such as, for example, an intranet, a local area network (LAN) or a wide area network (WAN). In one embodiment of the invention, network 102 represents a worldwide collection of networks and gateways that use the TCP/IP suite of protocols to communicate with one another. A backbone of high-speed data communication lines between major nodes or host computers allows communication between thousands of commercial, government, educational and other computer systems that route data and messages.

In one embodiment of the invention, network data processing system is a peer-to-peer decentralized system. In such a system 100, each one of target devices 112, 114, 116, 118, 122, 124, 126, 128, 136, 138 may serve as a server and may also serve as a client. Thus, target devices 112, 114, 116, 118, 122, 124, 126, 128, 136, 138 are able to perform tasks normally associated with clients and also to perform tasks normally associated with servers. In some embodiments of the invention, target devices 112, 114, 116, 118, 122, 124, 126, 128, 136, 138 may provide client-side interfaces through which users can perform client-related tasks, such as issuing queries and viewing search results. At the same time, each of target devices 112, 114, 116, 118, 122, 124, 126, 128, 136, 138 may also provide server-related tasks, such as accepting queries from other target devices, checking for requested data matches against its own data set and responding to other target devices with query results. Distributed system 100 is highly fault tolerant, as operation of system 100 will not be interrupted if a subset or node of target devices goes offline. For example, area 117 highlights one subset of target devices (comprising target devices 112, 114, 116, 118, 128, 136, 138) of system 100. Meanwhile, area 127 indicates a second subset of target devices (comprising target devices 122, 124, 126) of system 100. In a distributed system 100, if the subset of area 117 goes offline, this will not necessarily interrupt the operation of system 100, the operation of network 102 or the operation of area 127 or target devices 122, 124, 126. Conversely, if the subset of area 127 goes offline, this will not necessarily interrupt the operation of system 100, the operation of network 102 or the operation of area 117 or target devices 112, 114, 116, 118, 128, 136, 138.

Figure 2:
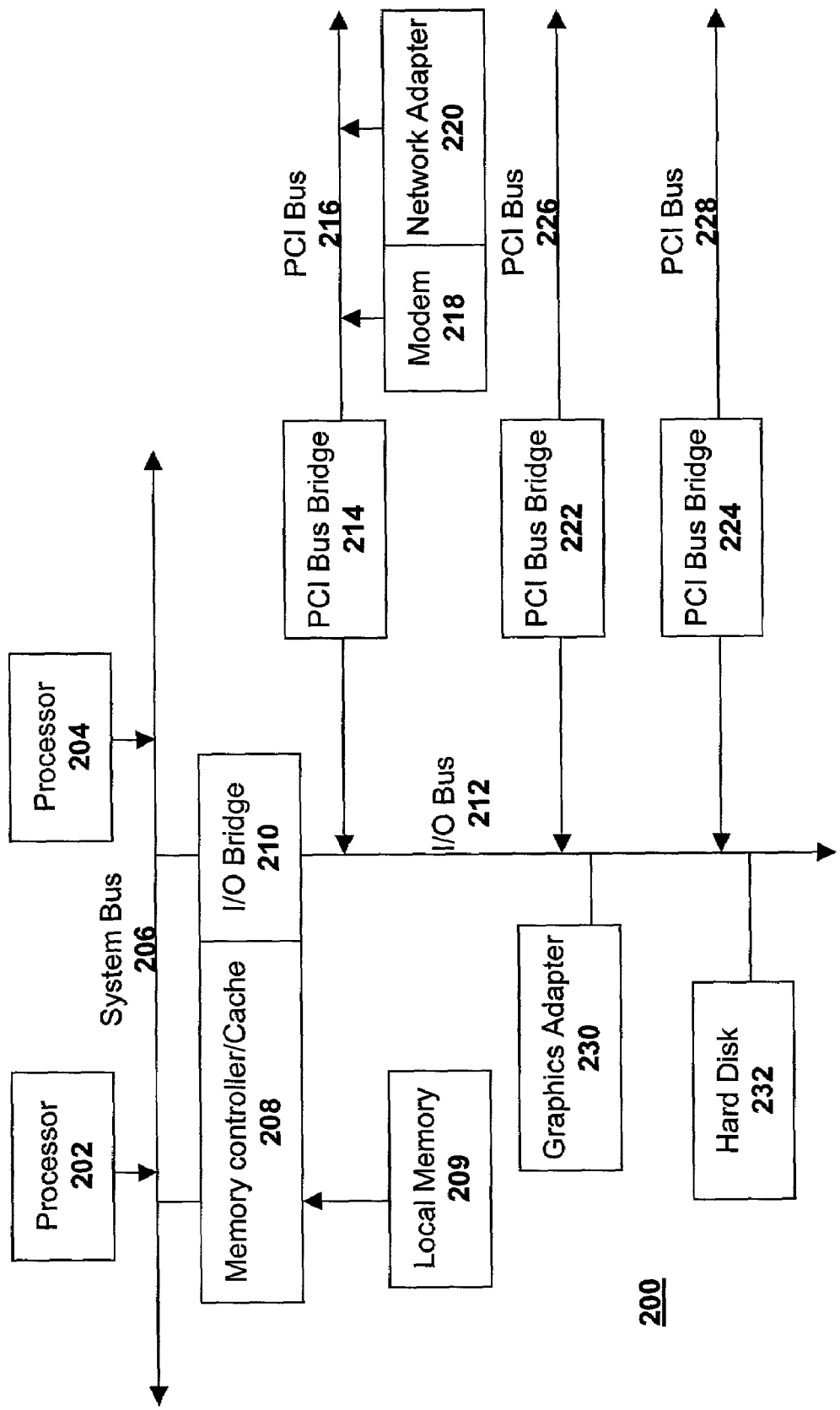
FIG. 2 is a block diagram of one embodiment of a data processing system in accordance with the present invention.
Figure 3:
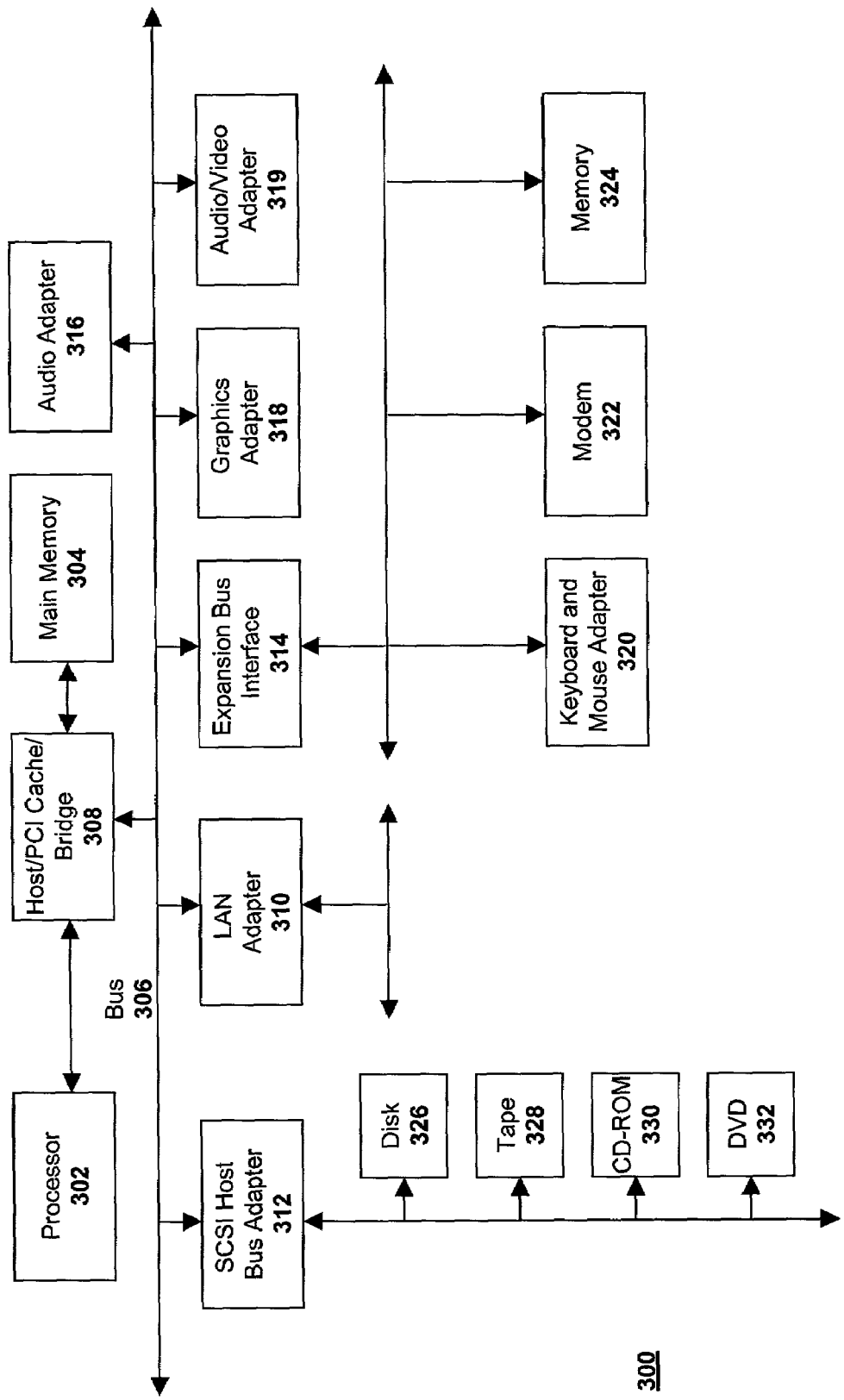
FIG. 3 is a block diagram of another embodiment of a data processing system in accordance with the present invention.

FIGS. 2 and 3 are block diagrams of embodiments of data processing systems that may be used in accordance with the present invention. In one embodiment of the invention, a given target device 112, 114, 116, 118, 122, 124, 126, 128, 136, 138 may be a data processing system incorporating any combination of one or more of the components described in FIGS. 2 and 3.

FIG. 2 is a block diagram of a data processing system in accordance with the present invention at 200. In one embodiment of the invention, data processing system 200 may be implemented as one or more of the target devices 112, 114, 116, 118, 122, 124, 126, 128, 136, 138 shown in FIG. 1. Alternatively, a given target device 112, 114, 116, 118, 122, 124, 126, 128, 136, 138 may incorporate one or more of the components described in FIG. 2.

Data processing system 200 may be a symmetric multiprocessors (SMP) system including a plurality of processors 202 and 204 connected to system bus 206. Alternatively, a single processor system may be employed. Memory controller/cache 208 may also be connected to system bus 206. Memory controller/cache 208 may provide an interface to local memory 209. I/O bus bridge 210 may also be connected to system bus 206 and may provide an interface to I/O bus 212. Memory controller/cache 208 and I/O bus bridge 210 may be integrated as depicted or may be separate components.

Peripheral component interconnect (PCI) bus bridge 214 connected to I/O bus 212 may provide an interface to PCI local bus 216. One or more modems may be connected to PCI bus 216. Typical PCI bus implementations will support four PCI expansion slots or add-in connectors. Modem 218 and network 220 may be connected to PCI local bus 216. This connection may be through add-in boards. In one embodiment of the invention, modem 218 and accompanying connections provide communications links to target devices such as network computers. For example, such target devices may be those described above at FIG. 1.

Additional PCI bus bridges 222 and 224 may provide interfaces for additional PCI buses 226 and 228. Additional modems or network adapters may be supported from PCI buses 226 and 228. For example, in one embodiment of the invention, PCI buses 226, 228 may support a network adapter with a remote loading feature, such as the RPL feature, installed. In this manner, data processing system 200 may allow connections to multiple network computers. A memory-mapped graphics adapter 230 and hard disk 232 may also be connected to I/O bus 212 as depicted, either directly or indirectly.

The components depicted in FIG. 2 may be arranged as shown or in any suitable manner that allows data processing system 200 to function as desired. Additionally, other peripheral devices, such as optical disk drives and the like, may be used in addition to or in place of the components depicted.

In one embodiment of the invention, data processing system 200 may include software and hardware components that enable system 200 to act according to a distributed peer-to-peer protocol in accordance with the present invention. This may include, for example, a set of data messages used for communicating data between one or more target devices and a set of rules governing the exchange of messages between one or more target devices. These messages and rules and methods of using these messages and rules in accordance with the present invention are further defined below.

FIG. 3 is a block diagram of a data processing system in accordance with the present invention at 300. In one embodiment of the invention, data processing system 300 may be implemented as one or more of the target devices 112, 114, 116, 118, 122, 124, 126, 128, 136, 138 shown in FIG. 1. Alternatively, a given target device 112, 114, 116, 118, 122, 124, 126, 128, 136, 138 may incorporate one or more of the components described in FIG. 3.

In one embodiment of the invention, data processing system 300 is a target device on which the disk drives are optional. Alternatively, data processing system 300 may be a stand-alone system configured to be bootable without relying on a network communication interface. Alternatively, data processing system 300 may also comprise one or more network communication interfaces. Data processing system 300 may also be a personal digital assistant (PDA) device. Data processing system may also take the form of a notebook computer or handheld computer. Alternatively, data processing system 300 may be a kiosk or Web appliance. The processes of the present invention may also be applied to a multiprocessor data processing system.

Data processing system 300 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 may be connected to PCI local bus 306 via PCI bridge 308. PCI bridge 308 may also include an integrated memory controller and cache memory for processor 302. Additional connections to PCI local bus 306 may be made through direct component interconnection or through add-in boards. In one embodiment of the invention, local area network (LAN) adapter 310, SCSI host bus adapter 312, and expansion bus interface 314 are connected to PCI local bus 306 by direct component connection. In contrast, audio adapter 316, graphics adapter 318 and audio/video adapter 319 are connected to PCI local bus 306 by add-in boards inserted into expansion slots. Expansion bus interface 314 may provide a connection for additional components such as, for example, a keyboard and mouse adapter 320, a modem 322 and additional memory

324. A small computer system interface (SCSI) host bus adapter 312 may provide a connection for additional components such as, for example, a hard disk drive 326, a tape drive 328, a CD-ROM drive 330 or a DVD 332. PCI local bus 306 may be any suitable local bus implementation. Typical PCI local bus implementations support three or four PCI expansion slots or add-in connectors.

Files and instructions for files such as operating files for an operating system, the object-oriented operating system, and applications or programs may be located on storage devices such as, for example, hard disk drive 326. These operating systems, applications and/or programs may be loaded into main memory 304 for execution by processor 302.

The components of system 300 depicted in FIG. 3 may be arranged as shown or in any suitable manner that allows data processing system 300 to function as desired. Other internal hardware or peripheral devices, such as flash ROM (or equivalent nonvolatile memory) or optical disk drives and the like, may be used in addition to or in place of the components depicted. For example, one embodiment of data processing system 300 may be configured with ROM and/or flash ROM in order to provide non-volatile memory for storing operating system files and/or user-generated data. Another embodiment of data processing system 300 may include network adapters suited to transmit or receive functions of a remote loading program and/or feature such as the RPL feature.

In one embodiment of the invention, data processing system 300 may include software and hardware components that enable system 300 to act according to a distributed peer-to-peer protocol in accordance with the present invention. This may include, for example, a set of data messages used for communicating data between one or more target devices and a set of rules governing the exchange of messages between one or more target devices. These messages and rules and methods of using these messages and rules in accordance with the present invention are further defined below.

Figure 4:
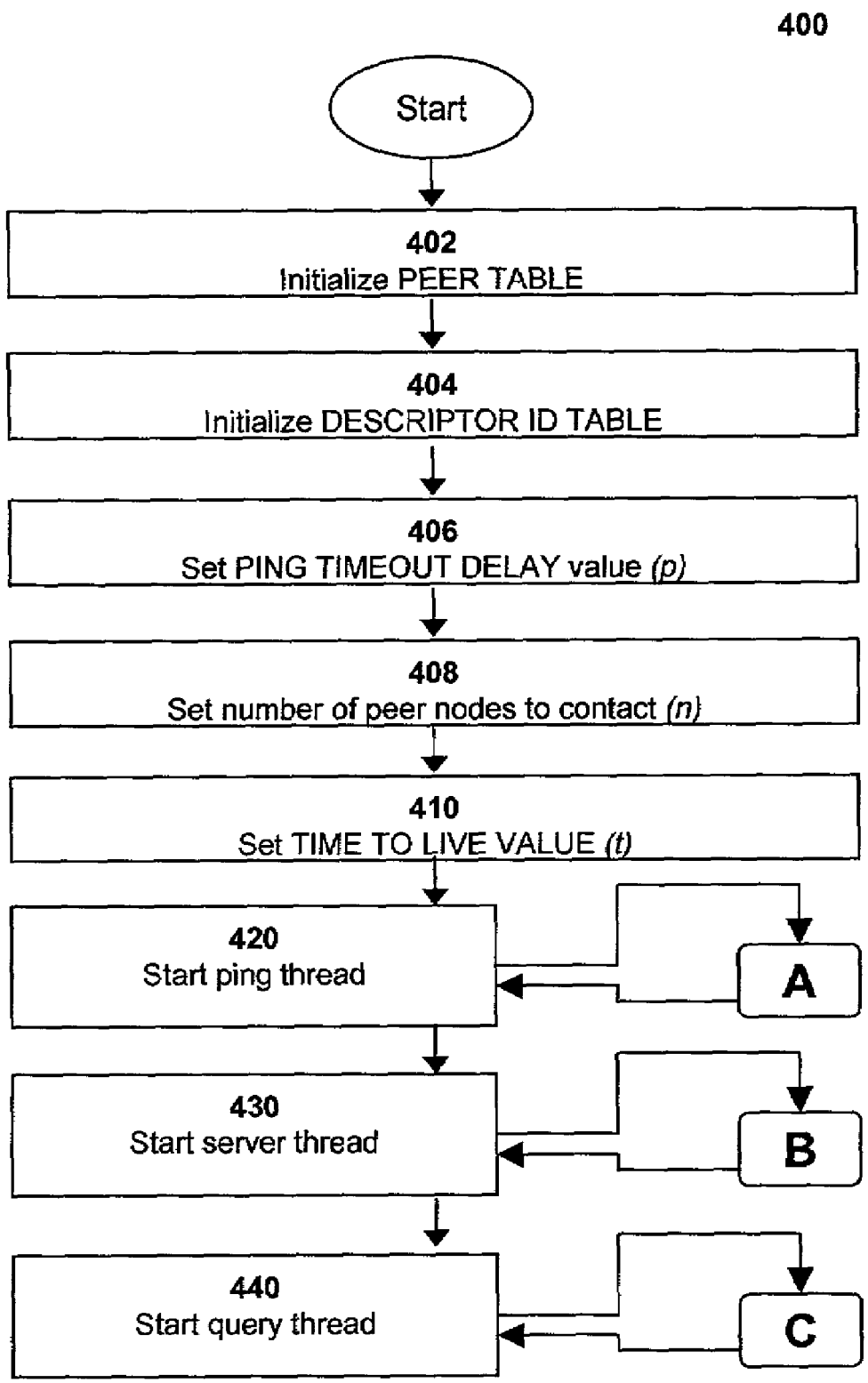
FIG. 4 is a flow diagram of one embodiment of a method of communicating among a plurality of target devices in a network environment in accordance with the present invention.

FIG. 4 shows one embodiment of a method for communicating among a plurality of target devices in accordance with the present invention at 400. The method shown in FIG. 4 may be implemented using any suitable peer-to-peer protocol that enables distributed searching and file sharing over networks.

Any suitable transport mechanism may be used to accomplish communication between the target devices or nodes, for example, using HTTP over TCP. Alternatively, a byte-level transport may be used. Alternatively, UDP may be used. Alternatively, HTTP/SOAP (Simple Object Access Protocol) may be used. SOAP is a simple XML-over-HTTP wrapper for popular connective technologies, such as COM, Apple Events and CORBA. The transport mechanism for SOAP is HTTP and a call in SOAP is specified using XML.

In one embodiment of the invention, the transport mechanism accomplishes communication between target devices in accordance with a suitable peer-to-peer protocol. This peer-to-peer protocol may include, for example, a set of data messages used for communicating data between one or more target devices and a set of rules governing the exchange of messages between one or more target devices. These messages and rules and methods of using these messages and rules in accordance with the present invention are further defined below.

For example, in one embodiment of the invention, one or more data messages may be sent between one or more target devices. These data messages may include any suitable data, such as responses to queries or commands, to be communicated from one target device to another. These data messages may be, for example, information in the form of 8-byte strings, 16-byte strings, 32-byte strings or any suitable sized string of data. The data messages may take the form of, for example, discovery (denoted herein as "ping") data messages, identification (denoted herein as "pong") data messages, query data messages and query response data messages. The data messages may be governed, for example, by rules such as timeout delays and time to live counters, as are well known in the art.

In accordance with the present invention, the data message may include a descriptor ID. In one embodiment of the invention, the descriptor ID may be a 16-byte string uniquely identifying a particular data message that is distributed on network 102 and/or system 100. For example, a 32-byte string sized data message may include a 16-byte string sized descriptor ID that uniquely distinguishes it from every other data message sent over the network. Thus, if a message comes to a particular target device more than once, the target device is able to recognize the message from the descriptor ID of the message.

As indicated above, the data message may be a discovery message (denoted herein as a "ping" message). This ping message may be used by one or more target devices 112, 114, 116, 118, 112, 124, 126, 128, 136, 138 to indicate that the ping message is actively querying network 102 and/or system 100. Such a ping data message may request the identification of one or more target devices. For example, target device 114 may send out a ping message to target devices 112, 116 and 118 asking target devices 112, 116, 118 to identify themselves. In one embodiment of the invention, a ping data message may request that the identification include an aggregated list (peer table) of a given target device's peer target devices. For example, target device 114 may send out a ping message to target devices 112, 116, 118 asking target device 112 to identify target device 112's peer devices, asking target device 116 to identify target device 116's peer devices and asking target device 118 to identify target device 118's peer devices.

In one embodiment of the invention, the peer-to-peer protocol may also include a ping timeout delay, which may be one rule used to govern ping data messages. This ping timeout delay may be a predetermined amount of time before a particular ping is sent out. For example, a ping may be sent out from a particular target device every p seconds. The value of the ping timeout delay may be determined using any suitable means known in the art. For example, the ping timeout value may be preset based on the specifications of the target device controlling the ping timeout delay. Alternatively, the user of a particular target device may set the value of the ping timeout delay. Alternatively, the ping timeout delay value may be based on such factors as network congestion and processing speed of the target device. Alternatively, the transport mechanism used by a given target device may determine the ping timeout delay value. Alternatively, a suitable algorithm may govern the ping timeout delay value. This algorithm may be based on, for example, the system limitations of a particular target device (peer node) or may be based on user input values.

As described above, the data message may also be an identification message (denoted herein as a pong data message). This pong message may be used by one or more target devices 112, 114, 116, 118, 112, 124, 126, 128, 136, 138 to respond to a target device that has broadcast a ping message. For example, target device 112 may send a pong message to target device 114 describing target device 112 to target device 114. In one embodiment of the invention, the pong message may contain the address of an active target device. Thus, target device 112 may send a pong message to target device 114 that gives the address of target device 112. If target device 114 has also sent a ping message to target device 118, target device 114 may also receive a pong message from target device 118, giving the IP address of target device 118. Alternatively, a pong data message may include one or more of the following: a port number on which the responding target device can accept incoming connections, the IP address of the responding target device, the number of files that the responding target device is sharing on the network, the number of kilobytes of data that the responding target device is sharing on the network. In one embodiment of the invention the pong data message may provide an aggregated list (or peer table) of the neighbor peer devices of a given target device. For example, target device 112 may send a pong message to target device 114 indicating to target device 114 that target device 112 has only 1 peer—target device 114. Meanwhile, target device 118 may also send a pong message to target device 114 indicating to target device 114 that target device 118 has 3 peers—target devices 114, 128, 138. The pong message from target device 118 may also provide information about the three peer devices 114, 128, 138 of target device 118, including the port number on which peer target device 114 can accept incoming connections, the port number on which second peer target device 128 can accept incoming connections, the port number on which third peer target device 138 can accept incoming connections, the IP address of peer target device 114, the IP address of second peer target device 128, the IP address of third peer target device 128 and any other suitable information.

As described above, the data message may also be a query message. This query message may be used by one or more target devices 112, 114, 116, 118, 112, 124, 126, 128, 136, 138 to request information from other target devices and any other components of network 102 or system 100. The query message may request, for example, information about software or hardware components of a given target device, about software or hardware configurations of a given target device, about software or hardware compatibility of a given target device or about files in the memory of a given target device. For example, target device 114 may send out a query data message to target devices 112, 116, 118 asking target devices 112, 116, 118 if they have a particular file. In one embodiment of the invention, the query message may also include a request for an aggregated list (or peer table) of its peer target devices. Other types of queries may also be broadcast in accordance with the present invention as is known in the art.

As described above, the data message may also be a response data message. This pong message may be used by one or more target devices 112, 114, 116, 118, 112, 124, 126, 128, 136, 138 to respond to a target device that has broadcast a query message. For example, target device 112 may send a response message to target device 114 indicating whether target device 112 has the file that target device 114 is seeking. If target device 114 has also sent a ping message to target device 118, target device 114 may also receive a response data message from target device 118 indicating whether target device 118 has the file that target device 114 is seeking.

The peer-to-peer protocol may allow any one of target devices 112, 114, 116, 118, 112, 124, 126, 128, 136, 138 to broadcast or receive data messages. Thus, for example, target device 128 may also send a ping message to target device 118 requesting an aggregated list of target device 118's peer target devices. Therefore, target device 128 may also receive a pong from target device 118, providing information about the three peer devices 114, 128, 138 of target device 118, including the port number on which peer target device 114 can accept incoming connections, the port number on which second peer target device 128 can accept incoming connections, the port number on which third peer target device 138 can accept incoming connections, the IP address of peer target device 114, the IP address of second peer target device 128, the IP address of third peer target device 128 and any other suitable information. Meanwhile, target device 116 may broadcast a query message and receive response data messages from other target devices 112, 114, 118, 112, 124, 126, 128, 136, 138.

Thus, the routine shown in FIG. 4 may take place at any one of target devices 112, 114, 116, 118, 112, 124, 126, 128, 136, 138 and, in one embodiment of the invention, may be occurring simultaneously at more than one given target device. Additionally, any one or target devices may be receiving data messages, such as, for example, peer tables, resulting from the routine of FIG. 4. Therefore, although the following paragraphs designate target device 114 as the originating peer node in relation to network 102 and target devices 112, 116, 118, 112, 124, 126, 128, 136, 138, any one or more of target devices 112, 116, 118, 112, 124, 126, 128, 136, 138 may also be originating peer nodes in relation to any other target devices in network 102 and/or system 100.

As seen at block 402, target device 114 may initialize a peer table. In one embodiment of the invention, this peer table may comprise a list of peer target devices and related information for each peer target device, such as IP addresses of each peer target device and the port on which each particular peer target device is accepting incoming connections. This may be accomplished in any suitable manner, such as, for example, by creating a database on or in communication with target device 114 for storing identifications of peer target devices and related information. Alternatively, this information may be collated in a suitable storage location on or in communication with target device 114. Alternatively, this information may be stored in a hash table and/or using a hashing function as is well known in the art.

As seen at block 404, target device 114 may also initialize a descriptor ID table. In one embodiment of the invention, this descriptor ID table may comprise a list of each unique descriptor ID and its corresponding data message received by and/or transmitted by target device 114. This may be accomplished in any suitable manner, such as, for example, by creating a database on or in communication with target device 114 for storing lists of descriptor IDs and related information. Alternatively, this information may be collated in a suitable storage location on or in communication with target device 114. Alternatively, this information may be stored in a hash table and/or using a hashing function as is well known in the art.

As seen at block 406, target device 114 may also set a value for a "ping" timeout delay as described above. This ping timeout delay may be a predetermined amount of time before a particular ping is sent out. For example, a ping may be sent out from a particular target device every p seconds. The value of the ping timeout delay may be determined using any suitable means known in the art. For example, the ping timeout value may be preset based on the specifications of the target device controlling the ping timeout delay. Alternatively, the user of a particular target device may set the value of the ping timeout delay. The ping timeout delay value may be based on such factors as network congestion and processing speed of the target device. The transport mechanism used by a given target device may determine the ping timeout delay value. A suitable algorithm may govern the ping timeout delay value. This algorithm may be based on, for example, the system limitations of a particular target device (peer node) or may be based on user input values.

As seen at block 408, target device 114 may then set a value n for the number of neighbor nodes (peer target devices) it will contact, i.e., connect with. The number of neighbor nodes to be contacted for a given target device may be determined using one or more suitable methods known in the art. For example, the number of peer nodes contacted from a given target device may be based on suitable parameters for the target device, such as, for example, user determined parameters, hardware parameters of the target device, software parameters of the target device, etc. For example, the user of a given target device 114 may indicate that target device 114 should contact at least 3 other neighbor nodes. Alternatively, the processing limitations of target device 114 may dictate that it should contact no more than 4 peer target devices. Alternatively, target device 114 may be pre-set to communicate with a given number of neighbor nodes. Alternatively, the transport mechanism used by a given target device may determine the number of neighbor nodes to be contacted. Alternatively, a suitable algorithm may govern the number of neighbor nodes to be contacted such as an algorithm based on number of neighbor nodes within network 102 or system 100 or based on user input values.

As seen at block 410, target device 114 may then set a time to live value t for the number of times a data message may be forwarded from one target device to another before the message expires. For example, target device 114 may set a data message to expire after it has been received by t number of target devices. The time to live value may be determined using any suitable means. For example, the value may be preset based on the specifications of the target device controlling the time to live value. Alternatively, the user of a particular target device may set the time to live value. The time to live value may be based on such factors as network congestion and processing speed of the target device. The transport mechanism used by a given target device may determine the time to live value. A suitable algorithm may govern the time to live value based on such factors as network congestion and processing limitations of a given peer node.

Each target device receiving a data message with a time to live value may increment a hops counter associated with the data message. This hops counter may be incremented by the target device upon receipt of the message using any suitable means known in the art. For example, a suitable algorithm may be used to increment the hops counter. As with the time to live value, the algorithm for determining the hops counter may be based on factors such as network limitations and processing limitations of a given peer node. This hops counter may indicate the number of times the data message has been received and may be compared against the time to live value t to determine if the message should be expired (i.e., does the number of times the message has been received, or the hops count, exceed the time to live value?).

As seen at blocks 420, 430 and 440, originating peer node 114 may also conduct one or more of the following threads: a ping thread, a server thread and a query thread. These threads may be conducted by target device 114 simultaneously or in any suitable order. These threads may occur continuously while target device 114 is on-line or in communication with network 102 and/or system 100. Alternatively, target device 114 may begin one or more of the threads upon receiving one or more data messages from another target device 112, 116, 118, 112, 124, 126, 128, 136, 138, or from any other component of network 102 and/or system 100.

As seen at block 420, target device 114 may thus begin a "ping" thread, described further below. Alternatively or simultaneously with block 420, target device 114 may also begin a "server" thread, described further below, as seen at block 430. Alternatively or simultaneously with blocks 420, 430, target device 114 may also begin a "query" thread, described further below as seen at block 450. Target device 114 may begin the "query" thread if it is determined at block 440 that one or more queries are to be broadcast from target device 114. Thus, in accordance with the present invention, target device 114 may perform client functions such as sending out queries, including ping queries and receiving responses, including pong responses. Target device 114 may also perform server functions such as processing queries and responses, including aggregating responses describing peer nodes into a peer table or tracking the times a particular query message is received.

Figure 5:
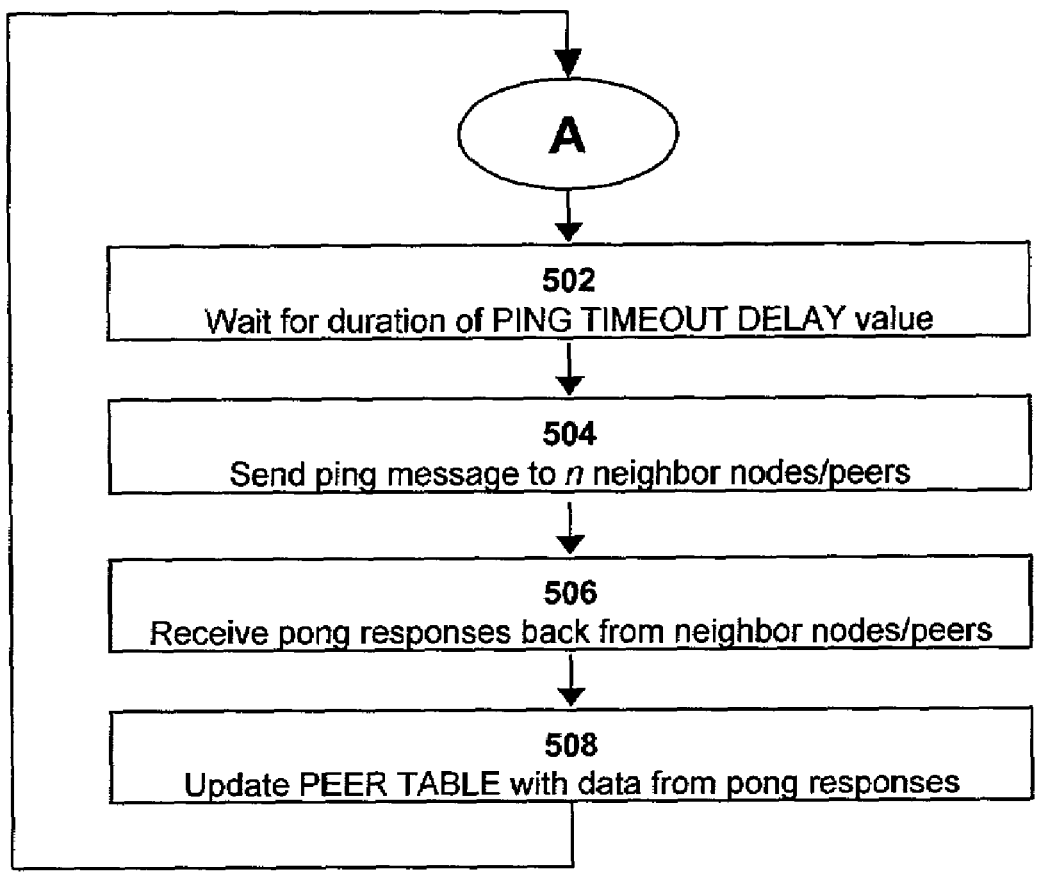
FIG. 5 is a flow diagram of one embodiment of a subroutine in the method of communicating among a plurality of target devices in a network environment shown in FIG. 4.

FIG. 5 shows one embodiment of a subroutine in the method of communicating among a plurality of target devices in a network environment of FIG. 4 at 500.

As seen at block 502, target device 114 may wait for the duration of the predetermined ping timeout delay value (p) determined at block 406. This ping timeout delay may be a predetermined amount of time before a particular ping is sent out. For example, a ping may be sent out from a particular target device every p seconds.

As seen at block 504, once the ping timeout delay value has elapsed, target device 114 may send a ping message to the predetermined number of neighbor (peer) nodes (n) set at block 408. Thus, in the embodiment shown in FIG. 1, the ping message is sent from target device 114 to three predetermined neighbor nodes 112, 116, 118 (i.e., n=3).

This ping message may be used by one or more target devices 112, 114, 116, 118, 112, 124, 126, 128, 136, 138 to indicate that the ping message is actively querying network 102 and/or system 100. Such a ping data message may request the identification of one or more target devices. For example, target device 114 may send out a ping message to target devices 112, 116 and 118 asking target devices 112, 116, 118 to identify themselves. In one embodiment of the invention, a ping data message may request that the identification include an aggregated list (peer table) of a given target device's peer target devices. For example, target device 114 may send out a ping message to target devices 112, 116, 118 asking target device 112 to identify target device 112's peer devices, asking target device 116 to identify target device 116's peer devices and asking target device 118 to identify target device 118's peer devices.

As seen at block 506, target device 114 may then receive pong messages from one or more of the predetermined number of peers contacted at block 504.

This pong message may be used by the contacted peer devices 112, 116, 118 to respond to the ping message broadcast by target device 114. For example, target device 112 may send a pong message to target device 114 describing target device 112 to target device 114. In one embodiment of the invention, the pong message may contain the address of an active target device. Thus, target device 112 may send a pong message to target device 114 that gives the address of target device 112. Target device 114 may also receive a pong message from target device 116, giving the IP address of target device 116, and a pong message from target device 118, giving the IP address of target device 118. In one embodiment of the invention the pong data message may provide an aggregated list (or peer table) of the neighbor peer devices of a given target device. For example, target device 112 may send a pong message to target device 114 indicating to target device 114 that target device 112 has only 1 peer—target device 114. Meanwhile target device 116 may also send a pong message indicating that target device 116 has two peers—target devices 114, 136. The pong message from target device 116 may also provide information about the two peer devices 114, 136 of target device 116, including the port number on which peer target device 114 can accept incoming connections, the port number on which second peer target device 136 can accept incoming connections, the IP address of peer target device 114, the IP address of second peer target device 136 and any other suitable information. Furthermore, target device 118 may also send a pong message to target device 114 indicating to target device 114 that target device 118 has 3 peers—target devices 114, 128, 138. The pong message from target device 118 may also provide information about the three peer devices 114, 128, 138 of target device 118, including the port number on which peer target device 114 can accept incoming connections, the port number on which second peer target device 128 can accept incoming connections, the port number on which third peer target device 138 can accept incoming connections, the IP address of peer target device 114, the IP address of second peer target device 128, the IP address of third peer target device 128 and any other suitable information.

As seen at block 508, target device 114 may then update the peer table initialized at block 402 with information received from the pong responses. This may be accomplished using any suitable means known in the art such as entering the peer table information from neighbor peer nodes 112, 116, 118 into a database or a storage location that is on or in communication with target device 114. Thus, from querying peer target devices 112, 116, 118, target device 114 is able to determine information about other devices 128, 138, 136 in the network. Meanwhile, because target device 114 is able to update its peer table with information about target devices 112, 116, 136, 118, 128, 138, a neighbor device 122 querying target device 114 would subsequently receive information about seven target devices from target devices 114—that is, information about target devices 112, 116, 136, 118, 128, 138, and 122.

Figure 6:
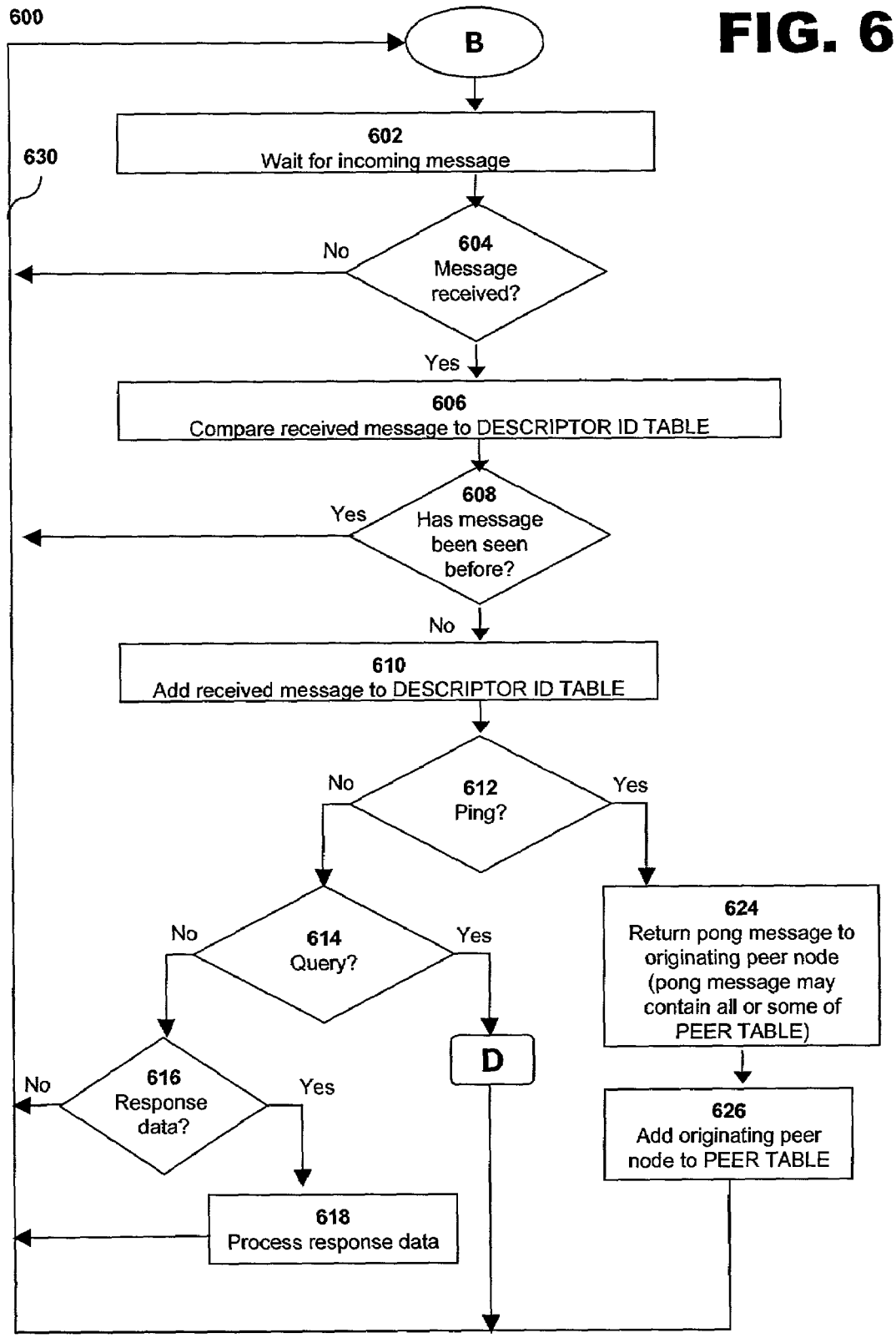
FIG. 6 is a flow diagram of one embodiment of another subroutine in the method of communicating among a plurality of target devices in a network environment shown in FIG. 4.

FIG. 6 shows one embodiment of another subroutine in the method of communicating among a plurality of target devices in a network environment of FIG. 4 at 600.

As seen at block 602, target device 114 may wait for an incoming data message. This data message may be any suitable data message as described above.

For example, the data message may be a ping data message requesting information from target device 114, such as a data message requesting the identification of target device 114. Alternatively, the data message may be a query data message asking target device 114 if it has a particular file. In one embodiment of the invention, the data message may be a request that target device 114 provide an aggregated list (or peer table) of its peer target devices.

Alternatively the data message may be a pong data message describing another target device to target device 114. In one embodiment of the invention, the pong data message may also provide an aggregated list (or peer table) of its neighbor peer devices. For example, target device 114 may receive a data message from target device 112 indicating to target device 114 that target device 112 has only 1 peer—target device 114. Alternatively, the data message may be a response data message responding to a query from target device 114.

At block 604, target device 114 determines if it has received a data message. Each data message, whatever its nature (i.e., ping data message, pong data message, search query message, etc.) may have a unique descriptor ID as described above.

If a data message has been received, the method proceeds to block 606, where the descriptor ID of the data message is compared to descriptor IDs of messages already stored in the Descriptor ID table created at block 404.

At block 608, target device 114 determines if the received data message has been seen before (i.e., if the received data message's descriptor ID matches any of the descriptor IDs already stored in the Descriptor ID table).

As seen at block 610, if the received message has not been seen before, target device 114 may add the received message and its corresponding descriptor ID to the Descriptor ID table.

As seen at block 612, target device 114 may then determine if the received message is a ping message as described above. If the received message is a message, as seen at block 624, target device 114 may return a pong message to the peer node from which the received message originated. In one embodiment of the invention, the pong response from target device 114 may include one or more of the following: a port number on which target device 114 can accept incoming connections, the IP address of target device 114, the number of files that the target device 114 is sharing on the network, the number of kilobytes of data that the target device 114 is sharing on the network. Alternatively, in one embodiment of the invention, the pong response from target device 114 may include all or part of an aggregated list (or peer table) of its neighbor peer devices. For example, in the embodiment of FIG. 1, the pong response from target device 114 may include information about target devices 112, 116, 136, 118, 128, 138, such as port numbers on which target devices 112, 114, 116, 136, 118, 128, 138, can accept incoming connections, IP addresses of target devices 112, 116, 136, 118, 128, 138, and any other suitable information.

In accordance with the present invention, the pong response is transmitted directly from the receiving target device 114 to the originating peer target device rather than being forwarded from the receiving target device through intervening target devices. Thus, for example, in the embodiment of FIG. 1, if target device 114 receives a ping message from peer target device 128 via intervening target device 118, target device 114 may respond directly to target device 128 with a pong message. Target device 114 may be enabled to respond directly to target device 128 because information about target device 128 has been made available to target device 114 in accordance with the present invention. For example, target device 114 may have information about target device 128 because target device 114 has previously updated its peer table with information about target device 128, such as the IP address of target device 128 (as seen at block 508).

Moreover, as seen at block 626, target device 114 may further update its peer table by adding information about the originating peer node to its peer table. Thus, continuing the above example, in the embodiment of FIG. 1, target device 114 may add information about target device 128 to its peer table. This information may include information about target device 128 such as the port number on which target device 128 can accept incoming connections, the IP address of target device 128, the number of files that the target device 128 is sharing on the network, the number of kilobytes of data that the target device 128 is sharing on the network. Alternatively, in one embodiment of the invention, the information from target device 128 may include all or part of an aggregated list (or peer table) of its neighbor peer devices. For example, in the embodiment of FIG. 1, the information from target device 128 may include information about other target devices connected with or in communication with target device 128 (not shown).

As seen at block 614, if the received message is not a ping data message, target device 114 may determine if the received message is another type of query. The query message may request, for example, information about software or hardware components of a given target device, about software or hardware configurations of a given target device, about software or hardware compatibility of a given target device or about files in the memory of a given target device. In one embodiment of the invention, the query message may describe a predetermined set of criteria to be met by a given target device (e.g., "Does the target device receiving this message have a file called PATENT.APP.DOC?" or "Is the target device receiving this message capable of running DOS?") If the received message is another type of query, the method of the present invention may proceed to the subroutine illustrated in FIG. 8, as indicated at D in FIG. 6.

Figure 8:
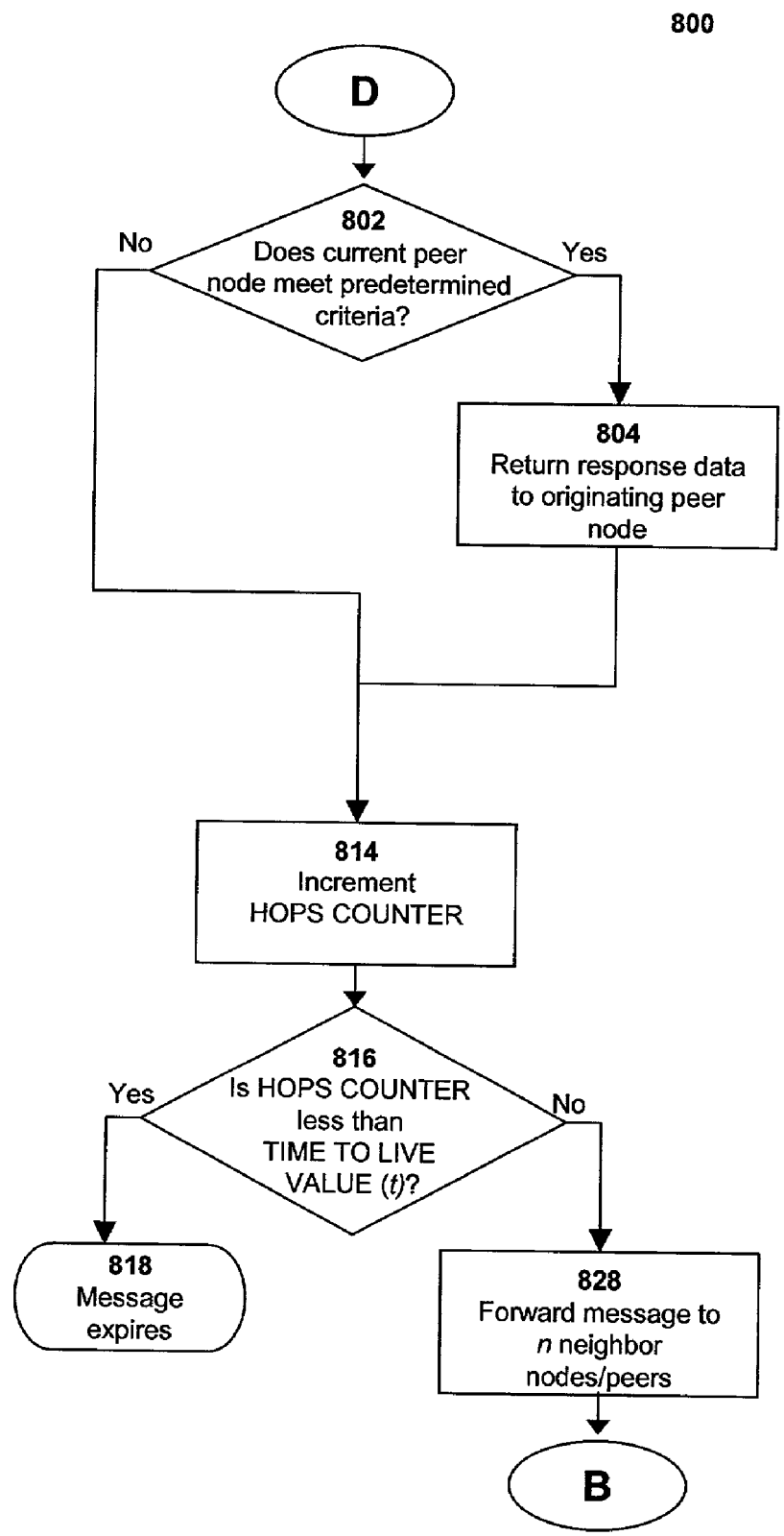
FIG. 8 is a flow diagram of one embodiment of another subroutine in the method of communicating among a plurality of target devices in a network environment shown in FIG. 4.

FIG. 8 shows one embodiment of another subroutine in the method of communicating among a plurality of target devices in a network environment of FIG. 4 at 800.

As seen at block 802, target device 114 may determine if it meets the predetermined criteria included in the query of the message received at block 604. This may be accomplished for example, by comparing the criteria included in the query message with any suitable component of target device 114. For example, if the received query message asks "Does the target device receiving this message have a file called PATENT.APP.DOC?", target device 114 may examine its files to determine if any files match the file requested in the received query message. If the received query message is asking "Is the target device receiving this message capable of running DOS?," target device 114 may evaluate its own system configuration to determine if it matches the configuration described in the received query message.

As seen at block 804, if target device 114 does meet the predetermined criteria, target device 114 may return response data to the target device from which the query originated. For example, target device 112 may broadcast a query message asking "Does the target device receiving this message have a file named 'PATENT.APP.DOC?" If target device 114 has the file PATENT.APP.DOC (i.e., meets the predetermined criteria), target device 114 may send a response to target device 112 indicating that target device 114 has the file. In one embodiment of the invention, if target device 114 does not have the file, target device 114 may also send a response indicating that it does not have the file.

In accordance with the present invention, if current target device 114 meets the predetermined criteria, target device 114 returns its response data directly to the originating peer target device rather than being forwarded from current target device 114 through intervening target devices. Thus, for example, in the embodiment of FIG. 1, if target device 114 receives a search query from peer target device 128 via intervening target device 118, target device 114 will send its response data directly to target device 128. Target device 114 may be enabled to respond directly to target device 128 because information about target device 128 has been made available to target device 114 in accordance with the present invention. For example, target device 114 may have information about target device 128 because target device 114 has previously updated its peer table with information about target device 128, such as the IP address of target device 128 (as seen at block 508).

Whether or not target device 114 meets the predetermined criteria of the query message, as seen at blocks 814, 816, 818, 828, the target device 114 may then determine whether to forward or expire the data message.

As seen at block 814, the query message may include or be associated with a hops counter, which may be incremented upon receipt of the data message. This hops counter may be incremented by the receiving target device 114 using any suitable means known in the art. For example, a suitable algorithm may be used to increment the hops counter. The algorithm for determining the hops counter may be based on factors such as network limitations and processing limitations of a given peer node. The hops counter may indicate the number of times the data message has been received. In one embodiment of the invention, each target device receiving the data message increments the hops counter each time the data message is received.

As seen at block 816, the hops counter may be compared against the time to live value t for the particular data message in order to determine if the message should be expired (i.e., does the number of times the message has been received, or the hops count, equal the time to live value?). In the embodiment shown in FIG. 8, the hops counter is compared against the time to live value t to determine if the hops counter is equal to the time to live value, and, if the hops counter is not equal, the message does not expire. In another embodiment of the invention, the hops counter is compared against the time to live value t to determine if the hops counter is greater than the time to live value, and, if the hops counter is greater than the time to live value, the message does not expire. In yet another embodiment of the invention, the hops counter is compared against the time to live value t to determine if the hops counter is less than the time to live value, and, if the hops counter is less than the time to live value, the message does not expire.

The time to live value may be determined using any suitable means. For example, the value may be preset based on the specifications of the target device controlling the time to live value. In one embodiment of the invention, the target device controlling the time to live value is the target device from which the data message originated. Alternatively, the user of a particular target device may set the time to live value. The time to live value may be based on such factors as network congestion and processing speed of the target device. The transport mechanism used by a given target device may determine the time to live value. Alternatively, a suitable algorithm may govern the time to live value based on such factors as network congestion and processing limitations of a given peer node.

As seen at block 818, if the hops counter equals the time to live value, the message may be expired. In one embodiment of the invention, once the message is expired, the receiving target device 114 no longer forwards the message to another target device.

As seen at block 828, if the hops counter does not equal the time to live value, target device 114 may then proceed to forward the data message to one or more other target devices. In the embodiment shown in FIG. 8, for example, the receiving target device may forward the message to a predetermined number (n) of neighbor nodes/peer target devices. This predetermined number of neighbor nodes may be determined by any suitable means, including those described at block 408 above.

Receiving target device 114 may then return to block 602, as indicated at B in FIGS. 6 and 8.

Returning now to FIG. 6, if the received message is not a ping message or query message, as seen at block 616, target device 114 may determine if the received message is a data message providing response data to a query broadcast by target device 114.

Such response data may be, for example, one or more of the following: port numbers on which one or more neighboring target devices can accept incoming connections, IP addresses of one or more neighboring target devices, the number of files that one or more neighboring target devices are sharing on the network, the number of kilobytes of data that one or more neighboring target devices is sharing on the network, information about software or hardware components of a given target device or about one or more neighboring target devices, information about software or hardware configurations of a given target device or about one or more neighboring target devices, information about software or hardware compatibility of a given target device or about one or more neighboring target devices or information about files available to a given target device or files available to one or more neighboring target devices.

The response data may also include all or part of an aggregated list (or peer table) from one or more neighbor peer devices. Alternatively, the response data may include an answer to a query sent by target device 114. For example, if target device 114 broadcasts a query asking "Do you have a file named TRADEMARK.APP.EXE?", the received message may be a response indicating that one or more neighboring target devices have the file. In one embodiment of the invention, the response data may be sent directly from a responding target device to the target device originally broadcasting the query.

For example, in the embodiment of FIG. 1, if target device 114 sends a query to neighbor devices 112, 116, 118, target device 114 may receive a response data message from target device 112 indicating to target device 114 whether target device 112 has the file. Target device 114 may also receive a data message from target device 116 indicating to target device 114 whether target device 116 has the file. Target device 114 may receive a data message from target device 118 indicating to target device 114 whether target device 118 has the file.

In addition, target device 114 may receive a data message directly from target device 136 indicating to target device 114 whether target device 136 has the file, even though target device 114 did not query target device 136 directly. Target device 136 may be enabled to respond directly to target device 114 because information about target device 114 has been made available to target device 136 in accordance with the present invention. For example, target device 136 may have information about target device 114 because target device 136 has previously updated its peer table with information about target device 114, such as the IP address of target device 114 (as seen at block 508).

Target device 114 may also receive data messages directly from target devices 128, 138 indicating whether each of these target devices 128, 138 has the file, even though target device 114 did not query target devices 128, 138 directly. Thus, from querying target devices 112, 116, 118, target device 114 is able to receive direct responses from target devices 112, 116, 136, 118, 128, 136.

As seen at block 618, target device 114 may then process the response data. For example, target device 114 may store the response data in a storage location on or in communication with target device 114. Alternatively, target device 114 may present the response data to a user via a user interface on or in communication with target device 114. For example, target device 114 may display the response data as search results to the user.

As indicated in FIG. 6 by loop 630, the routine of FIG. 6 may be repeated for any and all incoming messages.

Figure 7:
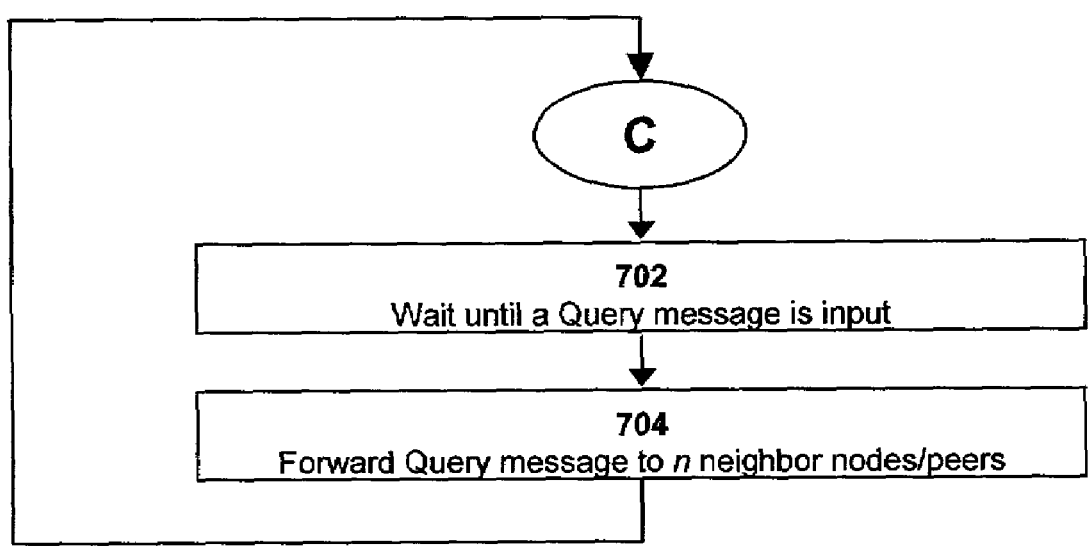
FIG. 7 is a flow diagram of one embodiment of another subroutine in the method of communicating among a plurality of target devices in a network environment shown in FIG. 4.

FIG. 7 shows one embodiment of another subroutine in the method of communicating among a plurality of target devices in a network environment of FIG. 4 at 700.

As seen at block 702, target device 114 may wait until a query is input. This query may be any suitable query as described above. The query may request information on, for example, one or more of the following: port numbers on which one or more neighboring target devices can accept incoming connections, IP addresses of one or more neighboring target devices, the number of files that one or more neighboring target devices are sharing on the network, the number of kilobytes of data that one or more neighboring target devices is sharing on the network, information about software or hardware components of a given target device or about one or more neighboring target devices, information about software or hardware configurations of a given target device or about one or more neighboring target devices, information about software or hardware compatibility of a given target device or about one or more neighboring target devices or information about files available to a given target device or files available to one or more neighboring target devices.

In one embodiment of the invention, a user may input a query. Alternatively, the query may be input from another target device or another component of network 102 and/or system 100. For example, a user may input, at target device 114 a query asking for the file "PATENT.APP.DOC".

As seen at block 704, target device 114 may then forward the query to a predetermined number of neighbor nodes n. This predetermined number of neighbor nodes may be determined by any suitable means, including those described at block 408 above. Target device 114 may then return to block 702, as indicated at C in FIGS. 4 and 7.

While the present invention has been described in the context of a fully functioning data processing system, it will be appreciated that the processes described may be distributed in any other suitable context. For example, the processes described may take the form of a computer readable medium of instructions. The present invention applies equally regardless of the type of signal-bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms such as, for example, radio frequency and light wave transmissions. The computer readable media may take the form of coded formats that are decoded for actual use in a particular data processing system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

The invention claimed is:

1. A method for communicating among a plurality of peer nodes in a network environment, comprising:
    communicating a discovery command from a current peer node to at least one neighbor peer node, the neighbor peer node in communication with the current peer node, the discovery command including time to live value indicative of the number of times that the discovery command is forwarded prior to communication expiration; and
    receiving, at the current peer node, an aggregated list of peer nodes, the aggregated list of peer nodes comprising information concerning at least one peer node in communication with the at least one neighbor node, the information including an IP address and a port number on which each peer node can accept incoming connections, and wherein each node waits for a predetermined ping time out delay between communicating a subsequent discovery command; and
    receiving, at the current peer node, a second discovery command from an originating peer node; and
    communicating, from the current peer node directly to the originating peer node, the peer table in response to the second discovery command.

2. The method of claim 1, further comprising:
    communicating the discovery command to a predetermined number of neighbor peer nodes.

3. The method of claim 2, further comprising:
    determining the number of neighbor peer nodes.

4. The method of claim 1, further comprising:
    creating a peer table at the current peer node; and
    updating the peer table with the aggregated list of peer nodes.

5. The method of claim 1, further comprising:
    receiving a data message at the current peer node, the data message having a unique descriptor.

6. The method of claim 5, further comprising:
    comparing the descriptor of the received data message to a descriptor table, the descriptor table comprising a plurality of data messages and associated descriptors.

7. The method of claim 6, further comprising:
    updating the descriptor table with the received data message and the descriptor of the received data message.

8. The method of claim 1 further comprising:
    forwarding a query command from the current peer node to a predetermined number of neighbor peer nodes.

9. The method of claim 1, further comprising:
    receiving, at the current peer node, response data directly from at least one other peer node, the at least one other peer node in communication with the at least one neighbor node.

10. The method of claim 1, further comprising:
    receiving, at the current peer node, a query command from an originating peer node; and
    communicating, from the current peer node directly to the originating peer node, response data in response to the query command.

11. The method of claim 10, further comprising:
    forwarding the query command from the current peer node to a predetermined number of neighbor peer nodes.

12. A computer program product in a recordable type computer usable medium for communicating among a plurality of peer nodes in a network environment, comprising:
    means for communicating a discovery command from a current peer node to at least one neighbor peer node, the neighbor peer node in communication with the current peer node, the discovery command including time to live value indicative of the number of times that the discovery command is forwarded prior to communication expiration; and
    means for receiving, at the current peer node, an aggregated list of peer nodes, the aggregated list of peer nodes comprising information concerning at least one peer node in communication with the at least one neighbor node, the information including an IP address and a port number on which each peer node can accept incoming connections, and wherein each node waits for a predetermined ping time out delay between communicating a subsequent discovery command; and
    means for receiving, at the current peer node, a second discovery command from an originating peer node; and
    means for communicating, from the current peer node directly to the originating peer node, the peer table in response to the second discovery command.

13. The product of claim 12, further comprising:
    means for communicating the discovery command to a predetermined number of neighbor peer nodes; and
    means for determining the number of neighbor peer nodes.

14. The product of claim 12, further comprising:
    means for creating a peer table at the current peer node; and
    means for updating the peer table with the aggregated list of peer nodes.

15. The product of claim 12, further comprising:
    means for receiving a data message at the current pea node, the data message having a unique descriptor; and
    means for comparing the descriptor of the received data message to a descriptor table, the descriptor table comprising a plurality of data messages and associated descriptors.

16. The product of claim 15, further comprising:
    means for updating the descriptor table with the received data message and the descriptor of the received data message.

17. The product of claim 12, further comprising:
    means for forwarding a query command for the current peer node to a predetermined number of neighbor peer nodes.

18. The product of claim 12, further comprising:
    means for receiving, at the current peer node, response data directly from at least one other peer node, the at least one other peer node in communication with the at least one neighbor node.

19. The product of claim 12, further comprising:
    means for receiving, at the current peer node, a query command from an originating peer node; and
    means for communicating, from the current peer node directly to the originating peer node, response data in response to the query command.

20. The product of claim 19, further comprising:
    means for forwarding the query command from the current peer node to a predetermined number of neighbor peer nodes.

21. A system for communicating among a plurality of peer nodes in a network environment, comprising:
    means for communicating a discovery command from a current peer node to at least one neighbor peer node, the neighbor peer node in communication with the current peer node, the discovery command including time to live value indicative of the number of times that the discovery command is forwarded prior to communication expiration; and means for receiving, at the current peer node, an aggregated list of peer nodes, the aggregated list of peer nodes comprising information concerning at least one peer node in communication with the at least one neighbor node, the information including an IP address and a port number on which each peer node can accept incoming connections, and wherein each node waits for a predetermined ping time out delay between communicating a subsequent discovery command; and means for receiving, at the current peer node, a second discovery command from an originating peer node; and means for communicating, from the current peer node directly to the originating peer node, the peer table in response to the second discovery command.

22. The system of claim 21, further comprising:

means for communicating the discovery command to a predetermined number of neighbor peer nodes; and means for determining the number of neighbor peer nodes.

23. The system of claim 21, further comprising:

means for creating a peer table at the current peer node; and means for updating the peer table with the aggregated list of peer nodes.

24. The system of claim 21, further comprising:

means for receiving a data message at the current peer node, the data message having a unique descriptor; and means for comparing the descriptor of the received data message to a descriptor table, the descriptor table comprising a plurality of data messages and associated descriptors.

25. The system of claim 24, further comprising:

means for updating the descriptor table with the received data message and the descriptor of the received data message.

26. The system of claim 21, further comprising:

means for forwarding a query command from the current peer node to a predetermined number of neighbor peer nodes.

27. The system of claim 21, further comprising:

means for receiving, at the current peer node, response data directly front at least one other peer node, the at least one other peer node in communication with the at least one neighbor node.

28. The system of claim 21, further comprising:

means for receiving, at the current peer node, a query command from an originating peer node; and means for communicating, from the current peer node directly to the originating peer node, response data in response to the query command.

29. The system of claim 28, further comprising:

means for forwarding the query command from the current peer node to a predetermined number of neighbor peer nodes.

* * * * *